US012632809B2

(12) United States Patent (10) Patent No.: US 12,632,809 B2
Zhang et al. (45) Date of Patent: May 19, 2026

(54) DATA COMPILATION AND EXECUTION DEVICE AND DATA COMPILATION AND EXECUTION METHOD

(71) Applicants: DIGIWIN CO., LTD., Shanghai (CN); DATA SYSTEMS CO., LTD., New Taipei City (TW)

(72) Inventors: Tuo Zhang, Shanghai (CN); Xiaoliang Ma, Shanghai (CN); Guoxin Sun, Shanghai (CN)

(73) Assignees: DIGIWIN CO., LTD., Shanghai (CN); DATA SYSTEMS CO., LTD., New Taipei City (TW)

( * ) Notice: Subject to any disclaimer, the term of this patent is extended or adjusted under 35 U.S.C. 154(b) by 344 days.

(21) Appl. No.: 18/186,946

(22) Filed: Mar. 20, 2023

(65) Prior Publication Data

US 2024/0281737 A1 Aug. 22, 2024

(30) Foreign Application Priority Data

Feb. 16, 2023 (CN) .......................... 202310124036.X

(51) Int. Cl.
*G06Q 10/0631* (2023.01)
*G06F 8/30* (2018.01)
*G06F 8/41* (2018.01)

(52) U.S. Cl.
CPC ......... *G06Q 10/06316* (2013.01); *G06F 8/37* (2013.01); *G06F 8/41* (2013.01); *G06F 8/47* (2013.01)

(58) Field of Classification Search
CPC ....... G06Q 10/06316; G06F 8/37; G06F 8/41; G06F 8/47; G06F 9/45504
See application file for complete search history.

(56) References Cited

U.S. PATENT DOCUMENTS

2019/0171485 A1* 6/2019 Bolkhovitin .............. G06F 9/50
2022/0107794 A1* 4/2022 Cheng ........................ G06F 8/41

FOREIGN PATENT DOCUMENTS

CN 107943486 A * 4/2018 ............... G06F 8/41

OTHER PUBLICATIONS

Ichiro Kuroah et al.; A Knowledge-Based Retargetable Compiler for Application Specific Signal Processors; IEEE; pp. 631-634; retrieved on Nov. 24, 2025 (Year: 1989).*

* cited by examiner

*Primary Examiner* — S. Sough
*Assistant Examiner* — Cuong V Luu
(74) *Attorney, Agent, or Firm* — JCIPRNET

(57) ABSTRACT

A data compilation and execution device and a data compilation and execution method. The data compilation and execution device includes a storage device and a processor. The storage device is configured to store a compilation module and an interpretation module. The processor is coupled to the storage device and configured to receive encapsulation data. The processor executes the compilation module to match a matching compiler corresponding to the encapsulation data from compilers according to the encapsulation data. The compilation module executes a data compilation flow by the matching compiler to generate executable data according to the encapsulation data. The processor executes the interpretation module to execute a corresponding flow according to the executable data. The data compilation and execution device and the data compilation and execution method automatically perform data encapsulation and task execution.

10 Claims, 4 Drawing Sheets

100

DATA COMPILATION AND EXECUTION DEVICE AND DATA COMPILATION AND EXECUTION METHOD

CROSS-REFERENCE TO RELATED APPLICATION

This application claims the priority benefit of China application serial no. 202310124036.X, filed on Feb. 16, 2023. The entirety of the above-mentioned patent application is hereby incorporated by reference herein and made a part of this specification.

BACKGROUND

Technical Field

The disclosure relates to a data processing technology, in particular to a data compilation and execution device and a data compilation and execution method.

Description of Related Art

Traditional business process flows are a set of fixed flows individually arranged by humans, and each execution step needs to be recoded into a new set of logic according to different situations and scenarios. Therefore, the traditional business process flows have the problems of high development difficulty and inability to achieve flexible adjustment and repeated use.

SUMMARY

The disclosure is directed to a data compilation and execution device and a data compilation and execution method, which can automatically perform data encapsulation according to selected component data, and automatically execute a task flow according to encapsulation data.

According to an embodiment of the disclosure, the data compilation and execution device of the disclosure includes a storage device and a processor. The storage device is configured to store a compilation module and an interpretation module. The processor is coupled to the storage device and configured to receive encapsulation data. The processor executes the compilation module to match a matching compiler corresponding to the encapsulation data from compilers according to the encapsulation data. The compilation module executes a data compilation flow by the matching compiler to generate executable data according to the encapsulation data. The processor executes the interpretation module to execute a corresponding flow according to the executable data.

According to an embodiment of the disclosure, the data compilation and execution method of the disclosure includes the following. Encapsulation data is received by a processor. A compilation module is executed by the processor to match a matching compiler corresponding to the encapsulation data from multiple compilers according to the encapsulation data. A data compilation flow is executed by the matching compiler to generate executable data according to the encapsulation data. An interpretation module is executed by the processor to execute a corresponding flow according to the executable data.

Based on the above, the data compilation and execution device and the data compilation and execution method of the disclosure can automatically match the compiler corresponding to the encapsulation data, convert the encapsulation data to the executable data, and match the corresponding interpreter to execute the flow of the executable data.

In order to make the above-mentioned features and advantages of the disclosure more comprehensible, the following embodiments are described in detail together with the accompanying drawings.

DESCRIPTION OF THE EMBODIMENTS

Figure 1:
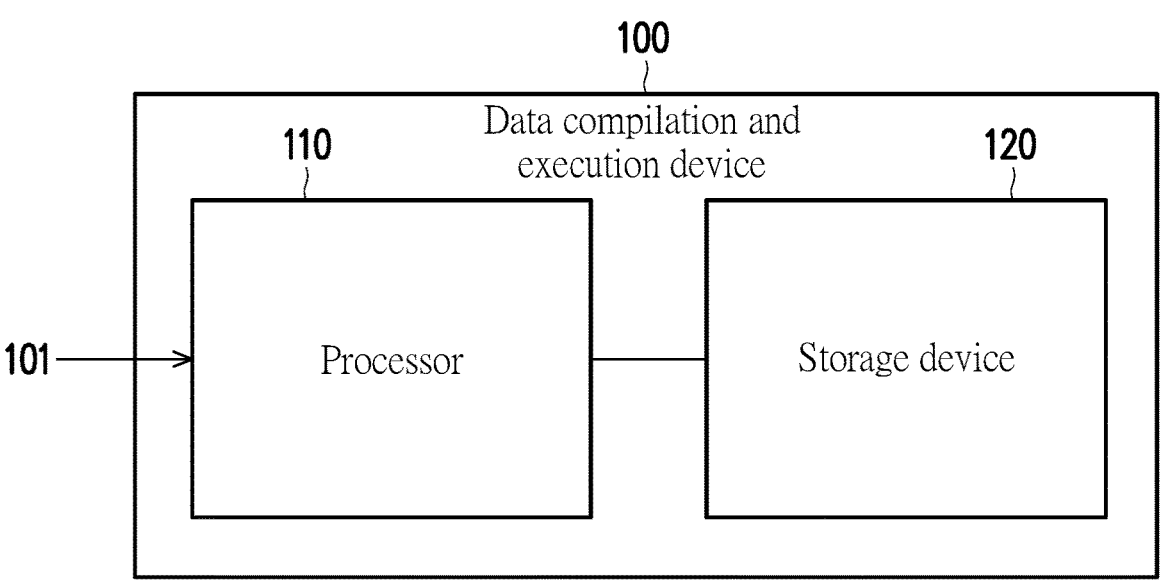
FIG. 1 is a schematic circuit diagram of a data compilation and execution device according to an embodiment of the disclosure.

Reference will now be made in detail to the exemplary embodiments of the disclosure, examples of the exemplary embodiments are illustrated in the accompanying drawings. Wherever possible, the same reference numerals are used in the drawings and descriptions to refer to the same or like parts.

It should be explained first that a data compilation and execution device and a data compilation and execution method of the disclosure can simplify the design difficulty and complexity of business process flows, and improve the extensiveness and reusability of applications. Encapsulation data described in the various embodiments of the disclosure may, for example, include at least one piece of flow data, task data, package data, and component data.

In this embodiment, the content of the encapsulation data is defaulted by a user or a system. The component data refers to a basic logic operation which may be completed, for example, a data source component (for example, used to call an application programming interface (API)), an execution component (such as logic data used to execute scripts), a control component (such as logical data used to determine whether conditions are met (such as determining whether a value is greater than 5 or determining whether a field includes "success"), a storage component, a display component (such as style element (such as a field position, a field color, a button position, and the number of cases) data on a page). In this embodiment, the package data refers to a processing logic comprising at least one piece of the component data, and includes a sequence of at least one piece of the component data, for example, the sequence is the data source component, the control component and the storage component. In other words, after the package data is combined with at least one piece of the component data, complex logic data may be executed. The package data may be, for example, a determining package comprising calling data from an API (i.e., the data source component), then retrieving a specific value (i.e., the execution component), and finally determining a specific value (i.e., the control component).

The task data includes at least one piece of the package data and the component data. In other words, the task data may comprise at least one piece of the package data and/or at least one piece of the component data. The task data may be a logical unit which may accomplish a specific business meaning, such as a task of generating a purchase requisition form based on purchase order form data or a task of converting the purchase requisition form to a purchase order form. The flow data includes at least one piece of the task data, the package data, and the component data, and the flow data means that, compared with task data, more complex data processing may be completed. The flow data may be a service flow or a processing flow comprising multiple pieces of the task data, the flow data is, for example, a business flow such as a work order dispatch flow, a purchase requisition form conversion, and a recording flow.

The component data includes data contents such as data types, states, characteristics, parameters. Moreover, for different types of the component data in different states, there will be a series of corresponding processing logics, so the disclosure can encapsulate the component data and logic as the task data, the package data or the flow data. When encapsulating a data flow, only data related to a core logic needs to be encapsulated (that is, data contents related to page styles are subtracted), and the data compilation and execution device of the disclosure can automatically match a suitable compiler and interpreter. In this way, the disclosure can greatly simplify the complexity of developing a new processing flow and improve the reusability of existing logic data, and can also generate more pieces of the task data and the flow data to execute according to the adjustment of user-defined parameters when running executable data.

FIG. 1 is a schematic circuit diagram of a data compilation and execution device according to an embodiment of the disclosure. Referring to FIG. 1, a data compilation and execution device 100 includes a processor 110 and a storage device 120. The processor 110 is coupled to the storage device 120. The data compilation and execution device 100 may also include an input device with an actual circuit element, a user interface, a communication interface, or a data transmission interface, etc., so that the processor 110 may receive instructions or signals of matching requests from data sources or external devices or according to user operations. In this embodiment, the data compilation and execution device 100 may be, for example, a personal computer, a workstation computer, or other electronic devices with data computing capabilities. In an embodiment, the data compilation and execution device 100 may also be integrated in a cloud server or a private server within an enterprise. In an embodiment, the data compilation and execution device 100 may be used, for example, to implement an enterprise resource planning (ERP) system, and may execute multiple APIs to call multiple task modules and task data. In an embodiment, the task data, the component data, the package data, and the flow data refer to a task logic (or a program) or a task flow for performing specific task functions according to business data, for example, it may be used to execute a task logic of a function of generating a purchase order form based on purchase order data, or for example, be used to execute a task logic of a function of generating a purchase requisition form according to purchase requisition data, and the disclosure is not limited thereto.

In this embodiment, the processor 110 of the data compilation and execution device 100 may include, for example, a central processing unit (CPU), or other programmable general purpose or special purpose microprocessors, a digital signal processor (DSP), an application specific integrated circuit (ASIC), a programmable logic device (PLD), other similar processing circuits, or a combination of these devices.

In this embodiment, the storage device 120 may implement a remote cloud storage service or a local data storage service. The storage device 120 may include a memory and/or a database, in which the memory may be, for example, a non-volatile memory (NVM). The storage device 120 may store related programs, modules, systems, or algorithms for implementing various embodiments of the disclosure, so as to be accessed and executed by the processor 110 to realize related functions and operations described in the various embodiments of the disclosure. The storage device 120 may also be used, for example, to cache the encapsulation data, the component data, and selected component data described in various embodiments of the disclosure.

Figure 2:
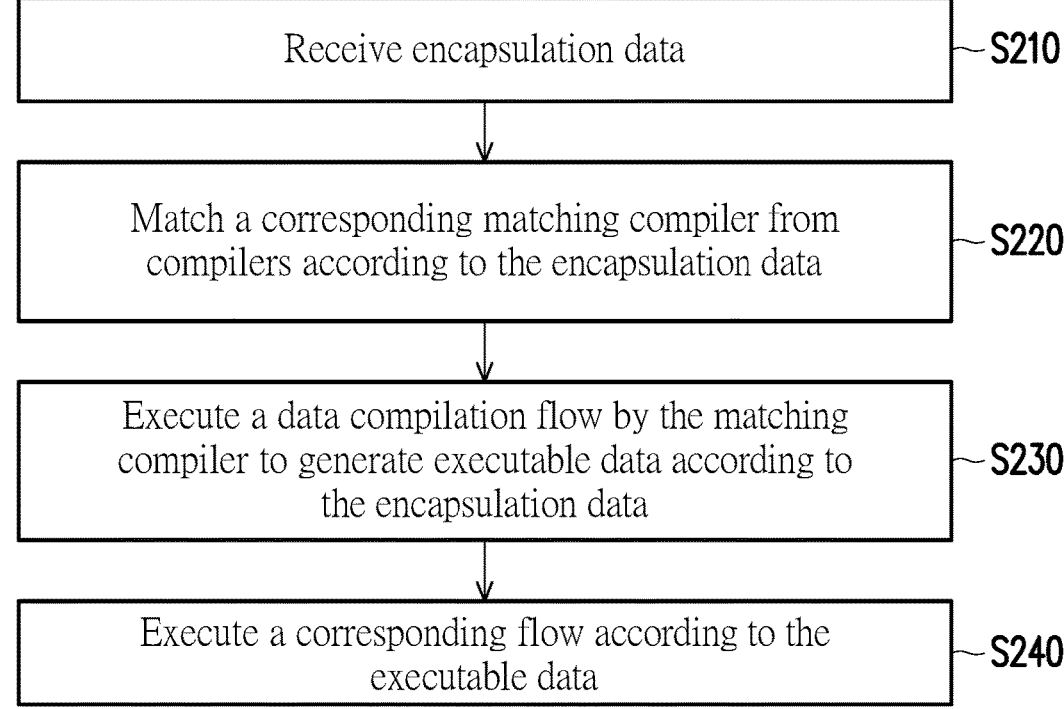
FIG. 2 is a flowchart of a data compilation and execution method according to an embodiment of the disclosure.
Figure 3:
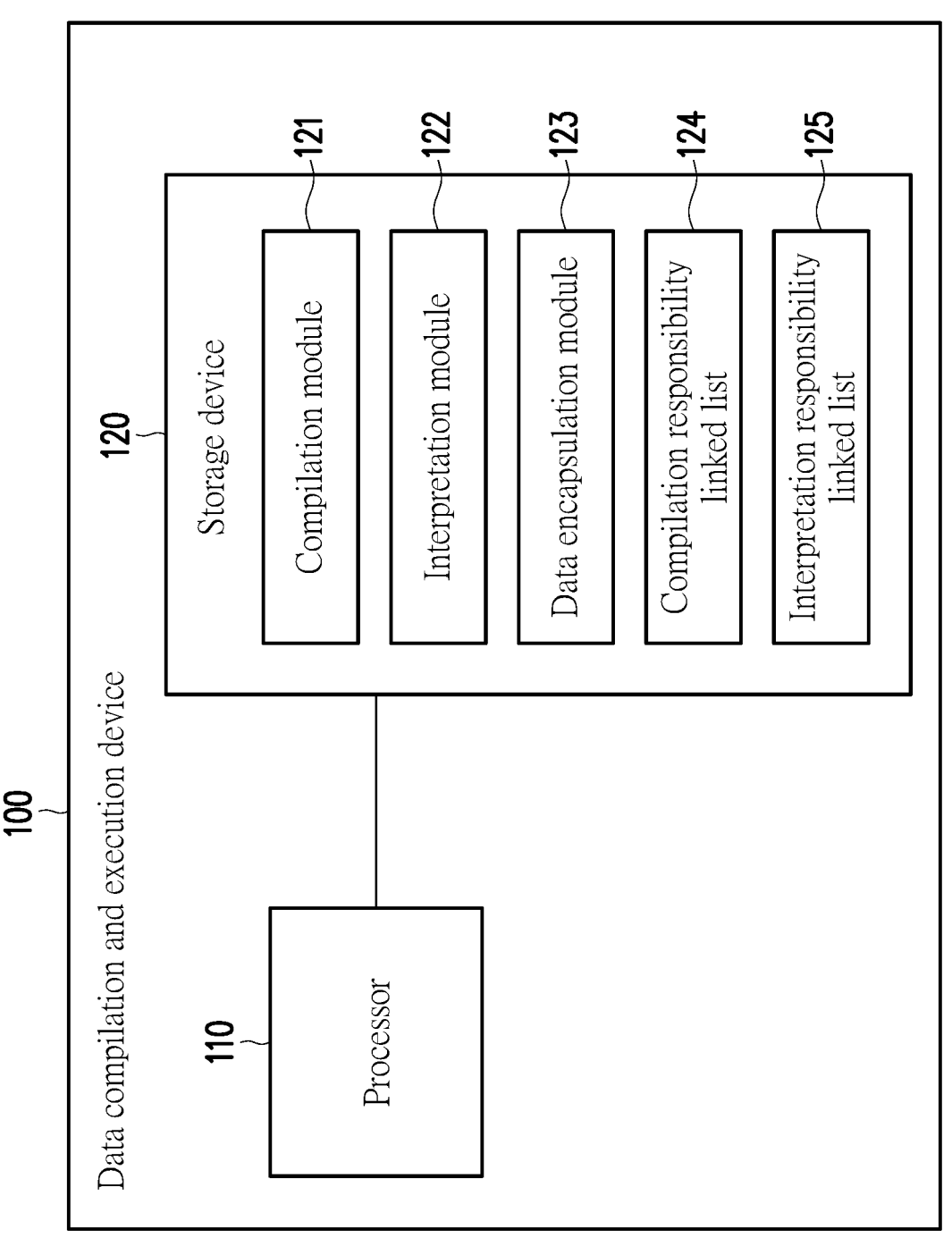
FIG. 3 is a schematic module diagram of a data compilation and execution device according to an embodiment of the disclosure.

FIG. 2 is a flowchart of a data compilation and execution method according to an embodiment of the disclosure. FIG. 3 is a schematic module diagram of a data compilation and execution device according to an embodiment of the disclosure. In this embodiment, the storage device 120 may store a compilation module 121, an interpretation module 122, a data encapsulation module 123, a compilation responsibility linked list 124, and an interpretation responsibility linked list 125. Referring to FIG. 1 to FIG. 3, the data compilation and execution device 100 may execute the following Step S210 to Step S240. In Step S210, the processor 110 may receive encapsulation data 101. In this embodiment, the processor 110 of the data compilation and execution device 100 may receive the encapsulation data 101 from a data source. For this, the data source may be, for example, raw business data or data obtained by an API. Alternatively, the encapsulation data 101 may also be artificially set data.

In Step S220, the processor 110 may match a corresponding matching compiler from compilers according to the encapsulation data 101. In this embodiment, the encapsulation data includes definition data, and the compilation module 121 finds the matching compiler which matches the encapsulation data from the multiple compilers according to the definition data. In an embodiment, the storage device 120 also stores the compilation responsibility linked list 124, and the compilation module 121 finds the corresponding matching compiler from the compilation responsibility linked list 124 according to the definition data. Specifically, the definition data is a definition parameter of each piece of the component data in the encapsulation data. The compilation responsibility linked list is a comparison table between definition types (that is, the definition parameters) and the compilers. In this way, the compilation module 121 may find the compiler (i.e., the matching compiler) matching the definition parameter correspondingly from the compilation responsibility linked list 124 according to the definition parameter of each piece of the component data in the encapsulation data 101.

In this embodiment, the encapsulation data 101 refers to being able to map certain transactions in the real world into the digital domain and encapsulate into data. In this embodiment, the encapsulation data 101 may include a record data type field, a data feature field, and a raw data field (the fields are described and implemented by a language of a corresponding coding program). In this embodiment, the encapsulation data 101 may also include other information recording such as environment information and page style. In step S230, the processor 110 may execute a data compilation flow by the matching compiler to generate executable data according to the encapsulation data 101. Compilation refers to converting instruction data, setting data, and processing logic to computer language data that may be executed by a computer program. In this embodiment, the executable data refers to data (i.e., the executable data) generated after the encapsulation data is compiled and executable by the computer program.

In Step S240, the processor 110 may execute a corresponding flow according to the executable data. In an embodiment, the storage device 120 also stores the interpretation responsibility linked list 125, and the interpretation module 122 sequentially executes a detailed flow of each piece of the component data in the executable data according to the interpretation responsibility linked list. The interpretation responsibility linked list 125 is a comparison table between interpreters and types of the executable data. The executable data includes at least one piece of the component data, and the component data includes the definition data. In other words, the interpretation responsibility linked list 125 includes a comparison table between types of the component data and the interpreters. In this embodiment, the processor 110 may execute the interpretation module 122 to read the detailed flow corresponding to each component data in the executable data, and sequentially execute the detailed flow.

For example, the executable data includes the processing logic of an API calling component (i.e., the data source component), a determining component, and an execution component and execution data. Next, the interpretation module 122 sequentially executes the API calling component, the determining component, and the execution component according to the executable data.

Figure 4:
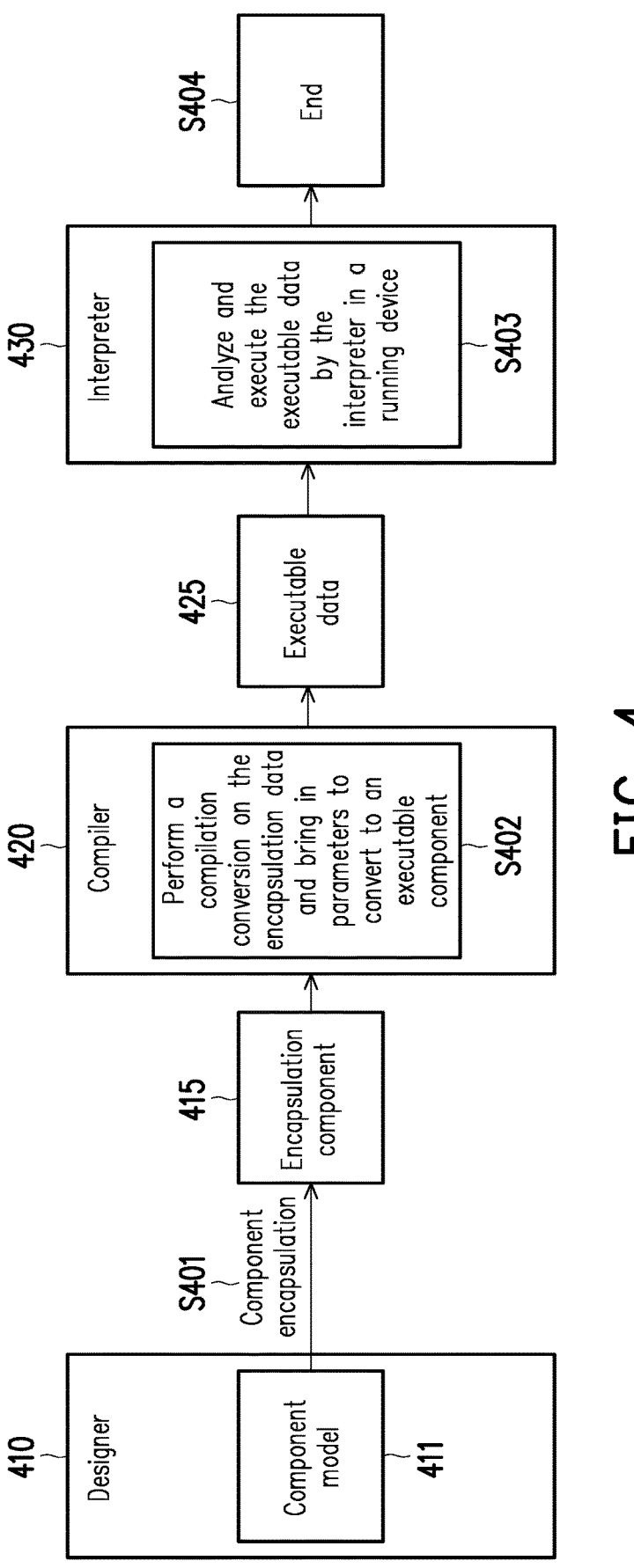
FIG. 4 is a flowchart of an encapsulation operation, a compilation operation, and an execution operation according to an embodiment of the disclosure.

FIG. 4 is a flowchart of an encapsulation operation, a compilation operation, and an execution operation according to an embodiment of the disclosure. Referring to FIG. 3 and FIG. 4, the data compilation and execution device 100 may further execute the following Step S401 to Step S404. In an embodiment, the processor 110 receives multiple pieces of selected component data. The processor 110 executes the data encapsulation module 123 to generate the corresponding encapsulation data 101 according to the multiple pieces of selected component data. The encapsulation data 101 includes at least one piece of the component data, the package data, the task data, and the flow data.

In this embodiment, the user may first select the component data desired to be encapsulated, and input into the data compilation and execution device 100, so that the processor 110 receives the multiple pieces of selected component data. In other words, the user selects the component data desired to be combined from a component model 411 of a designer 410 (that is, the data encapsulation module 123), and fills in the user-defined parameters. For example, the component data in the component model 411 includes, API types, field names, addresses, methods, headers, message types, and bodies. Next, the user selects the component data, and enters the user-defined parameters respectively, and the user-defined parameters may include fields such as obtaining logistics information, JSON, order001. In this way, the compiler 420 may encapsulate the selected component data including the user-defined parameters into the encapsulation data (i.e. an encapsulation component 415). When the interpreter 430 executes the component data, the interpreter 430 may execute the corresponding API processing logic to retrieve data information (such as purchase requisition information) from the corresponding address according to the user-defined parameters.

In Step S401, the designer 410 (that is, the data encapsulation module 123) receives the selected component data, sequentially performs component encapsulation on the selected component data (that is, including sequence parameters) to generate the encapsulation component 415 (i.e. the encapsulation data).

Next, in Step S402, the compiler 420 (i.e., the compilation module 121) performs a compilation conversion on the encapsulation data (i.e., the encapsulation component 415) and brings in parameters to convert the encapsulation component 415 to an executable component (i.e., the executable data 425). Specifically, the compiler 420 performs the compilation conversion on each component data in the encapsulation data, and sequentially brings in the user-defined parameters (such as a page style parameter), thereby generating the executable data 425. In an embodiment, the compiler 420 finds the corresponding matching compiler from the compilation responsibility linked list 124 according to the definition parameter of each piece of the component data in the encapsulation data, in this way, the compiler 420 may compile the corresponding component data by the matching compiler. The compilation responsibility linked list 124 may record the matching compiler corresponding to each definition parameter by a tree structure. The interpretation responsibility linked list 125 may record the interpreter corresponding to each definition parameter by a tree structure. The interpreter 430 may be, for example, a device configured to analyze and execute the corresponding component data.

In Step S403, the interpreter 430 (i.e., the interpretation module 123) receives the executable data 425. Also, the executable data 425 is analyzed and executed by the interpreter 430 in a running device. Specifically, the interpreter 430 performs analysis on each piece of the component data in the executable data 425 to obtain the flow data (i.e., the detailed flow) of each piece of the component data. In this way, the interpreter 430 may sequentially analyze each piece of the component data in the executable data 425 to obtain a processing logic (for example, converting a purchase requisition form to a purchase order form, generating a leave request form) of each piece of the component data, and the processing logic may respectively define fields with basic information, execution logic, definition information, etc., and then sequentially execute detailed flows corresponding to the component data. In Step S404, after the processor 110 completes each detailed flow of the executable data 425, the processor 110 ends the data compilation and execution flow.

Figure 5:
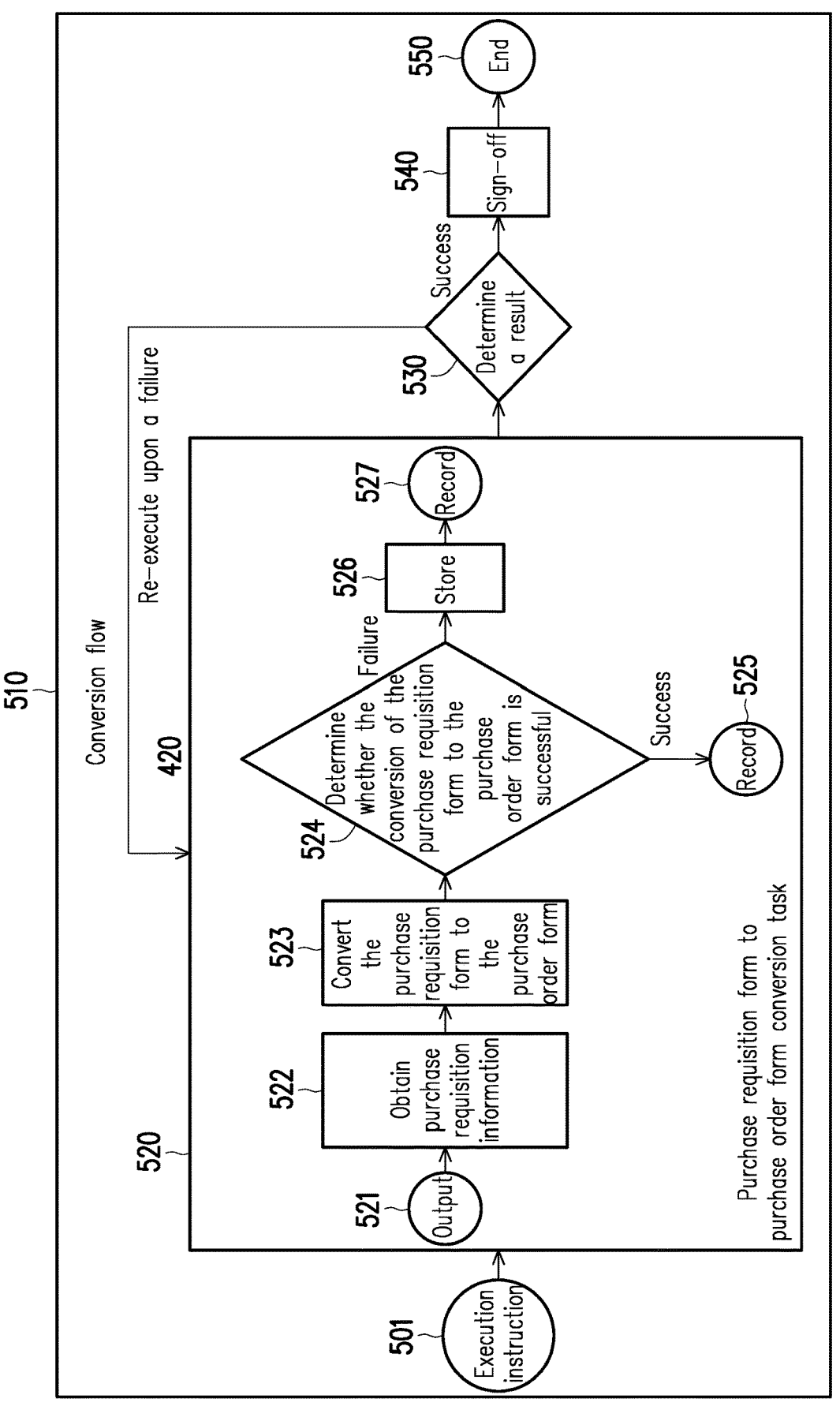
FIG. 5 is a schematic diagram of encapsulation data and executable data according to an exemplary embodiment of the disclosure.

FIG. 5 is a schematic diagram of encapsulation data and executable data according to an exemplary embodiment of the disclosure. In an embodiment, the task data includes at least one piece of the package data and the component data. Moreover, the flow data includes at least one piece of the task data, the package data, and the component data. Referring to FIG. 1, FIG. 4, and FIG. 5, the component data, the package data, the task data, and the flow data included in the encapsulation component 415 and the executable data 425 are exemplified in FIG. 5. A component 501 may be component data including an execution instruction. A purchase requisition form to purchase order form conversion task 520 includes an output component 521, an API component 522, an API component 523, a control component 524, a recording component 525, a storage component 526, and a recording component 527. It should be noted that the output component 521, the API component 522, and the API component 523 may be combined into a piece of package data. In other words, the component data, the package data, the task data, and the flow data may be assembled with each other, so the user may select multiple pieces of the component data to be combined into the package data according to a current business scenario, or the user may select at least one piece of the component data and the package data to be combined into the task data. Also, one piece of the component data, the package data, and the task data is selected to be combined into the flow data.

In this embodiment, the component 501, the purchase requisition form to purchase order form conversion task 520, the determining component 530, a sign-off component 540, and an ending component 550 may be combined into a conversion flow 510. It should be noted that the executable data 425 and the component data (i.e., the encapsulation component 415) include directional parameters. In this way, the interpretation module (i.e., the interpreter 430) may execute the flow of the executable data 425 according to context data (e.g., result data generated by executing the previous component data). The context data includes the user-defined parameter and the result data of the executed flow. For example, the component 501 may be execution instruction data that triggers the purchase requisition form to purchase order form conversion task 520, and then the purchase requisition form to purchase order form conversion task 520 may first output the execution instruction to the API component 522 by the output component 521. The API component 522 obtains the purchase requisition information from the corresponding API according to the execution instruction, and inputs the purchase requisition information to the API component 523. The API component 523 obtains purchase order form information from the corresponding API according to the purchase requisition information. Next, the control component 524 determines whether the conversion of the purchase requisition form to the purchase order form is a success according to the purchase order form information output by the API component 523. The control component 524 may determine whether the conversion is a success by checking whether the data (i.e., the context data) generated by the API component 522 and the API component 523 includes a field "conversion success" or "success".

In this embodiment, the recording component 525 is configured to record the successful conversion result into the storage device 120 when the control component 524 determines that the result is a success. The storage component 526 is configured to store the context data in the storage device 120 when the control component 524 determines that the result is a failure, and then serve as a basis for checking the conversion failure. The recording component 527 then records the data result of the conversion failure. The determining component 530 may, for example, determine whether the determination and execution of the whole purchase requisition form to purchase order form conversion task 520 is a success. For example, the determining component 530 may be used to determine whether the recorded data in the recording component 525 and the recording component 527 conform to the rules defaulted by the user, and then determine whether there is an error in the purchase requisition form to purchase order form conversion task 520. If the determining result of the determining component 530 is a failure, then the flow of the purchase requisition form to purchase order form conversion task 520 is re-executed, if the determining result of the determining component 530 is a success, then the flow of the sign-off component 540 is executed to perform a sign-off flow of the purchase order form. The ending component 550 is used when the execution of the previous flow is completed, the interpreter 430 executes an ending flow of the ending component 550 to end the conversion flow 510.

Therefore, the data compilation and execution device 100 and the data compilation and execution method of the disclosure can encapsulate the raw data into the encapsulation data, and then perform the compilation and processing on the encapsulation data by the corresponding compiler 420 to obtain the corresponding executable data, thereby reducing the size of the file when storing data and improving the reusability of data. In addition, the user may generate the flow data that conforms to the current business scenario (such as the flow of converting a purchase requisition form into a purchase order form) by inputting the user-defined parameters and selecting the component data according to different usage environments and situations.

Finally, it should be noted that, the above embodiments are merely used to illustrate the technical solutions of the disclosure, rather than to limit them; although the disclosure has been described in detail with reference to the embodiments, persons skilled in the art should understand that, they may still modify the technical solutions described in the embodiments, or perform equivalent replacements for some or all of the technical features. However, these modifications or replacements do not make the essence of the corresponding technical solutions depart from the scope of the technical solutions of the embodiments of the disclosure.

What is claimed is:

1. A data compilation and execution device, comprising:
   a storage device storing a compilation module and an interpretation module; and
   a processor coupled to the storage device and configured to receive encapsulation data,
   wherein the processor executes the compilation module to match a matching compiler corresponding to the encapsulation data from a plurality of compilers according to the encapsulation data,
   wherein the compilation module executes a data compilation flow by the matching compiler to generate executable data according to the encapsulation data,
   wherein the processor executes the interpretation module to execute a corresponding flow according to the executable data,
   wherein the executable data comprises a directional parameter, and the interpretation module executes a flow of the executable data according to context data, wherein the context data comprises a user-defined parameter and result data of the executed flow,
   wherein the encapsulation data comprises definition data, wherein the compilation module finds the matching compiler which matches the encapsulation data from the plurality of compilers according to the definition data,
   wherein the storage device also stores a compilation responsibility linked list, and the compilation module finds the matching compiler from the compilation responsibility linked list according to the definition data.

2. The data compilation and execution device according to claim 1, wherein the storage device also stores a data encapsulation module, wherein the processor receives a plurality of pieces of selected component data,
   wherein the processor executes the data encapsulation module to generate the encapsulation data according to the plurality of pieces of selected component data.

3. The data compilation and execution device according to claim 1, wherein the executable data and the encapsulation data each comprises at least one piece of component data, package data, task data, and flow data.

4. The data compilation and execution device according to claim 3, wherein the package data comprises a plurality of pieces of the component data, wherein the task data comprises at least one piece of the package data and the component data, wherein the flow data comprises at least one piece of the task data, the package data, and the component data.

5. The data compilation and execution device according to claim 3, wherein the storage device also stores an interpretation responsibility linked list, and the interpretation module sequentially executes a detailed flow of each piece of the component data in the executable data according to the interpretation responsibility linked list.

6. A data compilation and execution method, comprising:

receiving encapsulation data by a processor, wherein the encapsulation data comprises definition data, wherein a storage device stores a compilation responsibility linked list;

executing a compilation module by the processor to match a matching compiler corresponding to the encapsulation data from a plurality of compilers according to the encapsulation data, wherein the matching the matching compiler corresponding to the encapsulation data from the plurality of compilers comprises:

finding the matching compiler which matches the encapsulation data from the plurality of compilers by the compilation module according to the definition data, finding the matching compiler from the compilation responsibility linked list by the compilation module according to the definition data;

executing a data compilation flow by the matching compiler to generate executable data according to the encapsulation data; and executing an interpretation module by the processor to execute a corresponding flow according to the executable data, wherein the executable data comprises a directional parameter, wherein executing the corresponding flow according to the executable data comprises:

executing a flow of the executable data by the interpretation module according to context data, wherein the context data comprises a user-defined parameter and result data of the executed flow.

7. The data compilation and execution method according to claim 6, further comprising:

receiving a plurality of pieces of selected component data by the processor;

executing a data encapsulation module to generate the encapsulation data by the processor according to the plurality of pieces of selected component data.

8. The data compilation and execution method according to claim 6, wherein the executable data and the encapsulation data each comprises at least one piece of component data, package data, task data, and flow data.

9. The data compilation and execution method according to claim 8, wherein the package data comprises a plurality of pieces of the component data, wherein the task data comprises at least one piece of the package data and the component data, wherein the flow data comprises at least one piece of the task data, the package data, and component data.

10. The data compilation and execution method according to claim 8, wherein the storage device also stores an interpretation responsibility linked list, wherein executing the corresponding flow according to the executable data further comprises:

executing sequentially a detailed flow of each piece of the component data in the executable data by the interpretation module according to the interpretation responsibility linked list.

* * * * *